United States Patent [19]

Baker et al.

[11] 4,101,362

[45] Jul. 18, 1978

[54] METHOD FOR APPLYING TRANSFERS

[75] Inventors: Max Norris Baker, Rural Hall; Julian Richard Martin, Winston Salem, both of N.C.

[73] Assignee: R. J. Reynolds Tobacco Co., Winston-Salem, N.C.

[21] Appl. No.: 678,263

[22] Filed: Apr. 19, 1976

[51] Int. Cl.[2] .......................... B44C 1/16; B32B 1/10

[52] U.S. Cl. .......................... 156/235; 53/50; 156/238; 156/542; 156/DIG. 2; 156/DIG. 33

[58] Field of Search .............. 156/235, 238, 240, 541, 156/542, DIG. 2, DIG. 33, 230; 53/50, 137, 131

[56] References Cited

U.S. PATENT DOCUMENTS

| | | | |
|---|---|---|---|
| Re. 24,516 | 8/1958 | Brownlee | 156/541 |
| 2,988,834 | 6/1961 | Brownlee | 156/240 UX |
| 3,025,211 | 3/1962 | Winn | 156/542 |
| 3,752,308 | 8/1973 | Begemann | 206/273 X |

*Primary Examiner*—William A. Powell
*Assistant Examiner*—Thomas Bokan
*Attorney, Agent, or Firm*—Jones, Tullar & Cooper

[57] ABSTRACT

A machine for automatically applying transfers such as tax stamps to multiple packages contained in a carton is disclosed. The transfer applying machine comprises a conveyor for intermittently and sequentially advancing cartons through an opening station, where the carton is opened to expose the packages therein, through a stamping station, where tax stamps in the form of heat or water transfers or ink printing are applied to each of the packages, and through a closing station where the carton is closed and resealed. The machine is adjustable to accommodate a variety of carton and package sizes and to apply the transfers to each package in the carton accurately while using stock rolls of transfers on which the transfers are mounted with a predetermined spacing that does not necessarily correspond to the spacing of packages within the carton. The various sizes are accommodated by placing each carton on its side for passage through the machine, by providing a variable stop for each carton as it reaches the stamping station, and by shifting the transfers platen to correspond with the location of the carton and the transfer to be applied to the packages. The operating mechanism is simple in structure and function to provide an inexpensive and reliable machine.

13 Claims, 14 Drawing Figures

FIG. 2
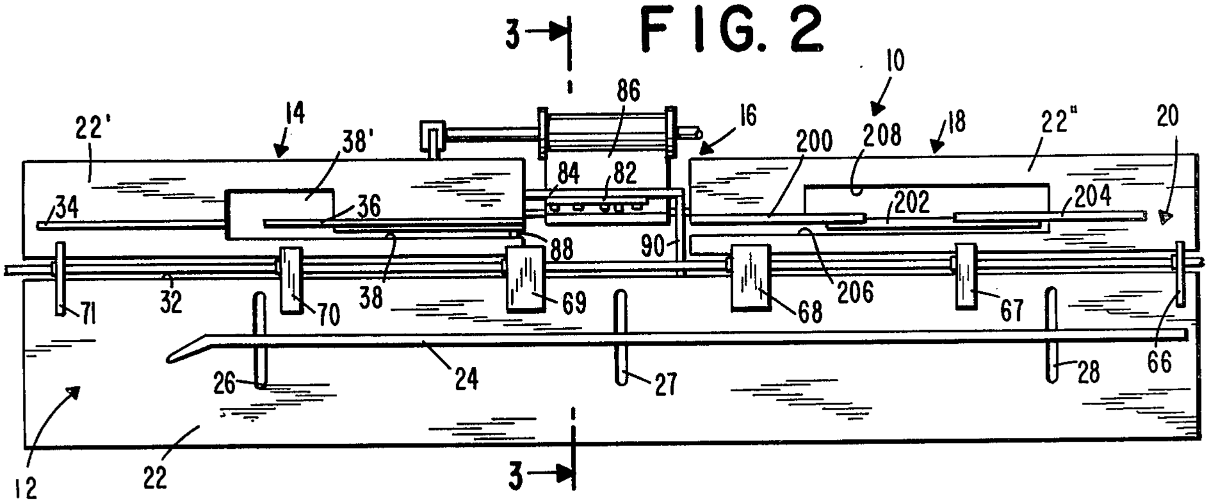
FIG. 12
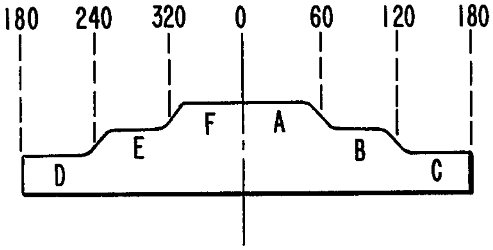
FIG. 5
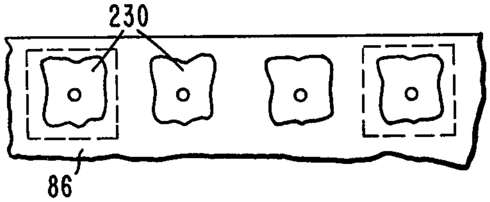
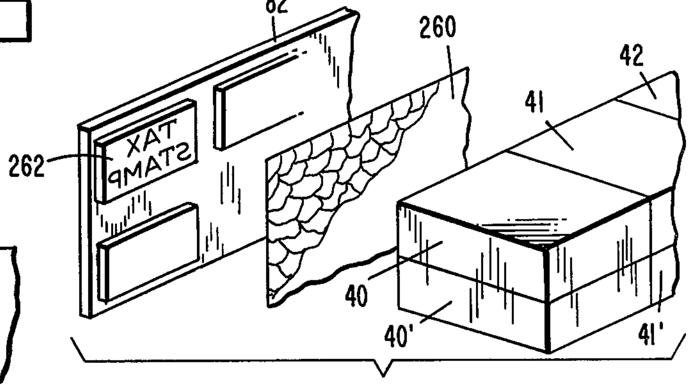
FIG. 14
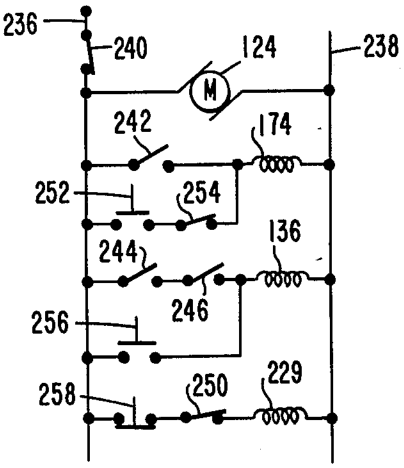
FIG. 13
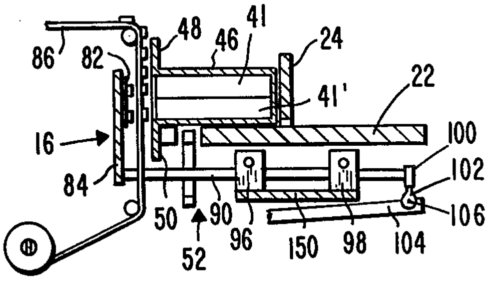
FIG. 3

METHOD FOR APPLYING TRANSFERS

BACKGROUND OF THE INVENTION

The present invention relates generally to the art of applying a plurality of transfers simultaneously and repetitively to an equal number of packages, and more particularly to the application of tax stamps, labels, or ink imprints to the individual packages of cigarettes in a carton without removing the packages from the carton.

As is known, taxes on the sale of cigarettes have become a major source of income for many state and local governments which, to insure payment of the appropriate taxes, require that revenue stamps or transfers be applied to each package of cigarettes before the package is sold at a retail outlet to the general public. The required tax stamps or transfers are usually mounted on long sheets or webs in the form of rolls which are then sold by the state or local government to the wholesale distributors of the cigarettes. The distributors must then open the cartons in which the cigarette packages are normally enclosed by the manufacturer, and the tax stamps or transfer must then be applied from the supply sheet to each package in the carton. The carton must then be reclosed and resealed for distribution to retail outlets.

Because the tax stamps are purchased by the roll, it is important to the distributor that each stamp on the roll be properly applied to the cigarette package so that stamps are not wasted. This means that they must be accurately positioned on the ends of the cigarette packages and, in order to avoid high labor costs, must be done as rapidly as possible. A large number of machines have been devised for expediting for foregoing process, and such machines have provided substantial savings over the costs of manual application of tax stamps or transfers, and thus have been highly successful. These machines have been designed to handle one or the other of the two basic processes which have evolved and which are now principally used in the application of tax stamps to cigarette packages; namely, the wet ink process, and the decalcomania transfer process. Thus, many of the presently available machines transfer the required imprinting to the cigarette packages by a wet ink process, wherein a desired pattern is printed on each package by means of a suitable inked printing head or by means of an inked transfer sheet, while other machines utilize decals or transferable patterns which are mounted on a backing sheet and which may be transferred to the cigarette packages through the application of heat or a solvent such as water. Although the present invention is equally applicable to ink-type stamping machines, its principal application is to the decal-type of transfer stamp and will be described with respect thereto.

The decal process, as presently in use in the industry utilizes a backing sheet with a plurality of transfers, which for convenience will be referred to herein as tax stamps, mounted thereon. The stamps are mounted on transfer rows of 15 and are spaced approximately $\frac{3}{4}$ inch apart, center to center. A multiplicity of rows extend the length of the sheet, the stamps in adjacent rows being spaced center to center by about $\frac{3}{4}$ inch. These sheets are formed into rolls, and the rolls are advanced to expose pairs of rows of stamps to the transfer mechanism of the stamp applying machine for transferring selected stamps to corresponding packages of cigarettes. Since each carton of cigarettes contains ten packages, five in each of two rows, it will be seen that only one-third of the stamps in each row of stamps will be transferred to the packages in a given carton, and two adjacent rows therefore contain enough tax stamps for three cartons of cigarettes. The arrangement of these sheets and their manner of application to successive cartons of conventional cigarette packages are illustrated, for example, in U.S. Pat. No. 3,513,616 to Davis, and in particular FIG. 12 thereof.

Decal sheets and the machines for using them have been standard for many years. Such machines typically provide a mechanism for advancing the carton through an opener station, where the carton is opened, through a stamping station, where the required tax stamp or indicia is applied, and finally through a reclosing station where the carton is closed and sealed. The variety of machines available for this purpose may be illustrated by U.S. Pat. Nos. 2,516,783 to Matter, 2,216,884 to Kott, 2,574,087 to Burhans, 2,595,122 to Burhans, 3,121,300 to Rossi, and many others. Each of these patents discloses a mechanism for opening and resealing cartons of cigarettes and for applying a tax stamp of some kind to the packages while the carton is open.

Many of the machines developed in this art, particularly those produced in the earlier years, were designed to accommodate a single size of carton having cigarette packages of a standard size, for virtually all cigarettes sold were of a single size and were wrapped in standard packages. When the "king" size and "imperial" size cigarettes were introduced, it was found that many of the earlier machines could not handle them, and it became necessary to modify the machines or to replace them. Later machines, therefore, were produced to accommodate these larger cigarettes, and were made adjustable to permit the machine to selectively handle the various sizes available on the market. Such a machine is illustrated in U.S. Pat. No. 3,513,616 to Davis mentioned above. However, the design changes in these machines were made principally to enable them to handle cigarettes of various lengths, the remaining dimensions of the cigarettes, and thus of the packages, remaining essentially unchanged and requiring no modifications.

The machines of the prior art generally required that the cigarette cartons be disposed so that the packages of cigarettes were upright, and adapting them to accommodate longer lengths involved very substantial modifications in the machines, since such accommodation generally required changing the vertical distance between the conveyor mechanism and the stamp-applying mechanism. Many machines were stretched to their limit of adaptability by the king size cigarettes, which are approximately 100 millimeters long. Since the width and depth of each cigarette package remained essentially unchanged for king-sized cigarettes, however, it was unnecessary to modify the tax stamping mechanism for such machines.

With the advent of the hard box packaging for cigarettes, and with the advent of hard filters, the package dimensions changed slightly, requiring a slightly wider and slightly deeper package than the standard $2\frac{1}{8} \times \frac{7}{8}$ inch packages. However, this small change in dimension did not seriously affect the operation of prior machines since the overall size of a carton did not change sufficiently to remove the packages from the range of the tax stamp applying mechanism, although with these packages the stamps were no longer uniformly positioned on the ends of all the packages in a carton. Thus, the prior art machines have been able to accommodate to previous changes in cigarette styles without encountering significant difficulty, and various improvements have been made to increase the speed of operation of such machines so that satisfactory performance is maintained. However, because such machines have been constructed to handle cigarette cartons in a specified way, they have only limited adjustability, and this limitation has prevented such machines from being adapted to the most recent evolution in cigarette styles.

The newly introduced extra long cigarettes, which are 120 millimeters or more long, are also slimmer than prior cigarettes, and result in a package which is considerably narrower than the standard size, although its depth is approximately the same. Thus, the dimensions of the ends of the package are 1 13/16 × 13/16 inch, as opposed to the $2\frac{1}{8} \times \frac{7}{8}$ inch size of the standard package. When these new cigarettes are packaged in a carton of 10, in the conventional manner, the length of the carton is reduced by almost an inch, and such cartons cannot be accepted in the old style stamp applying machines. Not only are the cigarettes too long to fit into most of the machines, but the smaller dimensions of the package ends, where the stamps are to be applied, prevents the packages from being aligned by the conventional machines with the tax stamps on the standard roll of stamps. Thus, for example, where a standard carton top or bottom might measure $10\frac{5}{8}$ inches × $1\frac{7}{8}$ inches, the new 120 millimeter cigarette cartons measure approximately 9 5/16 inch × $1\frac{5}{8}$ inch. Since this difference is greater than the distance between adjacent stamps on a decal roll, it has not been possible to utilize conventional machines for the application of stamps to the cigarettes. Thus, it has been necessary either to place the stamps on the cigarettes by hand, an extremely expensive procedure as compared to the usual machine operation, or to incorporate spaces in the cartons to separate the packages, again an expensive procedure which is wasteful of material and which adds an additional complication to the packaging methods used at the factory.

Because the new 120 millimeter length cigarettes at the present time have only a small share of the overall cigarette market, it has not been economical for machine manufacturers to rebuild their machines to the smaller scale required for the smaller package dimensions or for the manufacturer of the decal sheets to change the arrangement of the tax stamps on the rolls. Further, since the application of stamps is normally a job that is performed by small distributors or jobbers in small, local areas, the cost of any new machines required to handle small quantities of cigarettes simply cannot be justified economically. Accordingly, manual stamping continues as the only way to apply the required stamps to these new style cigarettes.

SUMMARY OF THE INVENTION

It is an object of the present invention to provide a method of applying stamps and a fully adjustable stamp applying machine for carrying out the method by transferring stamps from a sheet to a plurality of packages, and more particularly for applying tax stamps to the ends of cigarette packages contained in cartons of 10, where the packages may be of any size currently on the market, and wherein the machine is adaptable easily and quickly to any such size.

Another object of the present invention is to provide a method of applying transfers and a transfer applying machine for carrying out the method by placing tax stamps on cigarette packages, which machine is adjustable to insure proper location of each carton in turn so that the decals will be properly applied to the end of each package in the carton, the mechanism being easily adjustable to insure operation with all sizes of cigarette packages now on the market, and with sufficient flexibility to enable it to adapt to additional sizes should they become commercially desirable.

Briefly, the stamp or transfer applying machine of the present invention consists of a conveyor for advancing cartons of cigarettes sequentially through an opening station, a stamping station, and a closing station formed along a guide chute, the chute being adjustable to accommodate all lengths of cigarettes. The cartons are placed in the chute with the packages lying on their sides, so that the ends of the packages to which the stamps or transfers are to be applied will be in a generally vertical plane. A transfer sheet is located adjacent the guide chute with two rows of transfers being aligned with the two rows of packages in the carton. A drive mechanism for the conveyor intermittently advances the cartons in spaced relationship through the guide chute, each carton being halted at the stamping station long enough for the stamps or transfers to be applied. The conveyor may be in the form of a drive chain, and it includes a plurality of pusher members, or spacer blocks, secured thereto at spaced locations. The blocks are selected as to size and/or position on the chain so as to properly position each carton in turn in alignment with the stamps which are to be applied from the transfer sheet when the chain stops. By utilizing various sizes of spacer blocks, which may be replaceably secured to the drive chain, the location at which each carton in turn stops in the stamping station may be selected with great accuracy, without the need for adjusting the interconnection between the drive mechanism and the chain. This has the advantage of not affecting the synchronization of the machine drive mechanism, and insures that the chain and the movable printing or decal transfer apparatus will remain in the proper relationship for the transfer operation.

The transfer mechanism includes a heated platen mounted for reciprocating motion in a horizontal plane toward and away from the exposed ends of the cigarette packages in the open cartons. When a carton is properly positioned for the transfer operation, the platen is moved forward into contact with the back surface of the decal sheet, the platen contacting the sheet at spaced areas corresponding to the location of a first set of transfers on the sheets and driving them into contact with the individual packages of cigarettes in the carton. The platen holds the transfer sheet in contact with the packages momentarily, allowing the tax stamps to be transferred from the decal sheet to the packages, and then withdraws. The carton is then moved to the closing station, another carton moves into the printing station, and the operation is repeated. However, before a subsequent transfer can be carried out, the platen must be adjusted laterally to align with a second set of transfers on the sheets, and because of the small size of the packages, the position of the carton must be adjusted to correspond to this lateral motion and to align the new packages with this second set. The above described spacer blocks accomplish this carton positioning, so that the second set of transfers is properly located with respect to the cigarette packages. After three cartons are so stamped, a first stamping cycle, wherein all of the transfers in the initial two rows will have been applied, will be complete, and the transfer sheet is advanced to position two more rows in the transfer station. A second cycle of operation follows, wherein the transfers of the second pair of rows are applied in sets, with the platen being adjusted laterally in the opposite direction for alignment with the appropriate sets, the platen returning to its initial position at the end of the second cycle. The machine continues to operate repetitively through these two cycles.

BRIEF DESCRIPTION OF THE DRAWINGS

The foregoing and additional objects, features and advantages of the present invention will become evident to those of skill in the art from a consideration of the following detailed description of a preferred embodiment of the invention, taken in conjunction with the accompanying drawings, in which:

FIG. 2 is a top plan view of the machine of FIG. 1 in its assembled condition;

FIG. 3 is a cross-sectional view taken along line 3—3 of FIG. 2, showing the relationship of the transfer mechanism to a package to which transfers are to be applied;

FIG. 5 is an enlarged partial illustration of a transfer sheet of the type used in conjunction with the present invention;

FIG. 12 is a diagrammatic illustration of the shape of the drive cam used to position the platen in the machine of FIG. 1;

FIG. 13 is a diagrammatic illustration of a portion of the control circuitry used with the machine of FIG. 1; and FIG. 14 is an exploded partial view of a modified transfer apparatus for use with the machine of FIG. 1.

DESCRIPTION OF PREFERRED EMBODIMENTS

Figure 1:
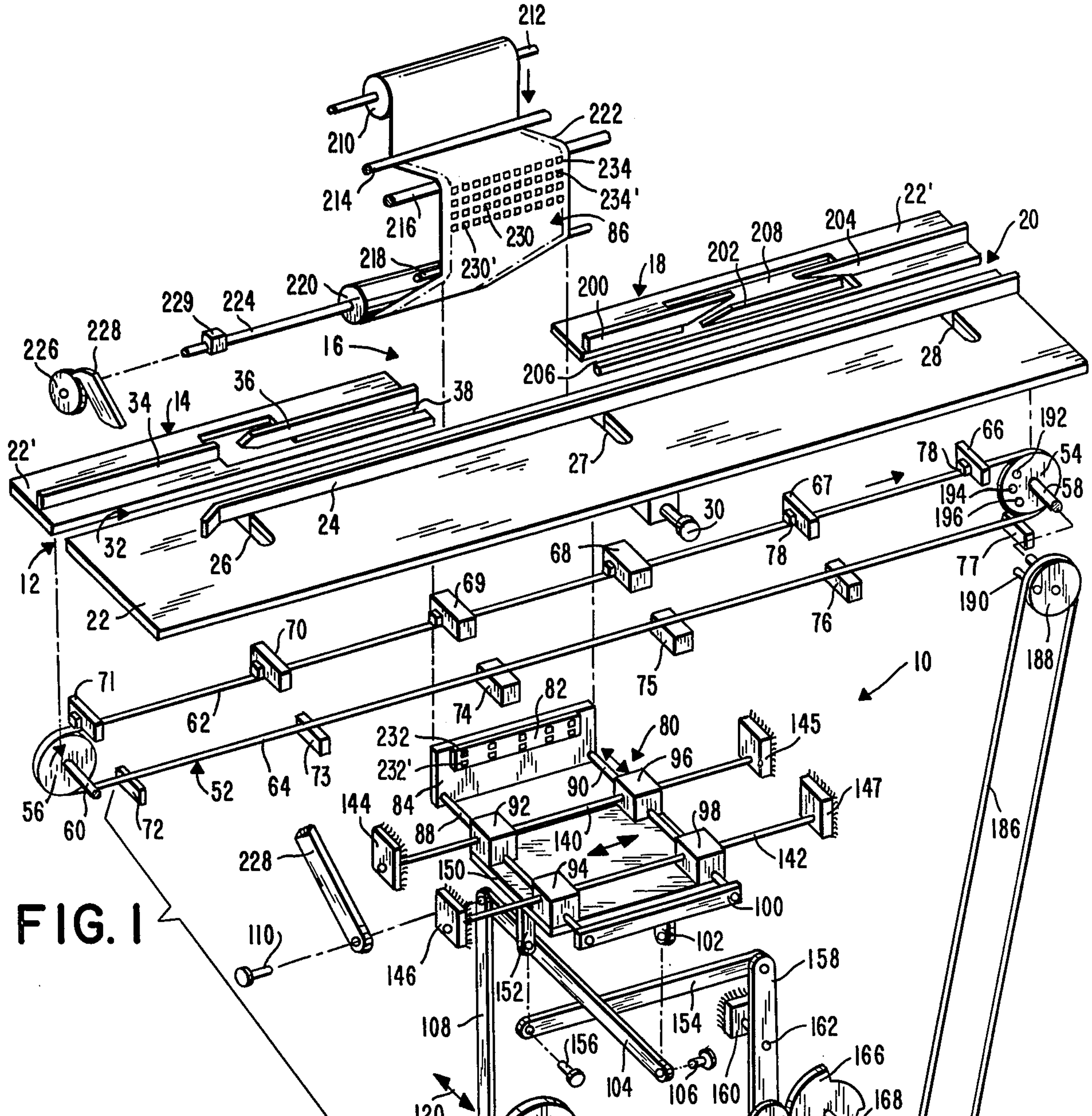
FIG. 1 is an exploded diagrammatic view of a machine embodying the principles of the present invention.
Figure 1:
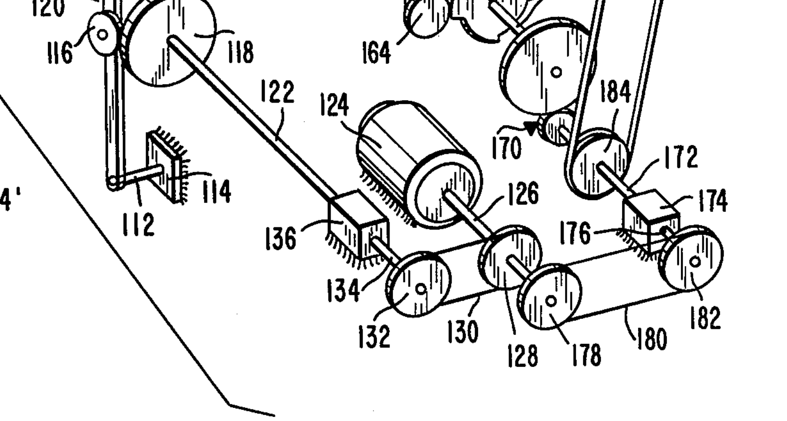

Turning now to a more detailed consideration of the present invention, reference is made to the drawings, and in particular FIGS. 1 and 2, wherein there is illustrated generally at 10 a machine constructed in accordance with the principles of the present invention. This machine incorporates a loading station 12 at the left hand end of the machine as viewed in FIG. 1; a carton opening station generally indicated at 14, a transfer station 16, a carton closing station 18, and a discharge station 20, indicated at the right hand end of the machine. These stations, or areas of the machine, are supported on a base or table 22 which is generally horizontal and which carries an adjustable guide rail 24 that defines a guide chute and positions and guides the cartons of cigarettes or other packages through the machine. This guide rail is supported on the table legs or brackets extending through slots 26, 27 and 28 in the table top, which legs are secured to a threaded adjusting mechanism (not shown) controllable by means such as a hand wheel 30. Rotations of the handwheel slides the support legs for rail 24 along slots 26–28, thereby moving rail 24 and adjusting the width of the guide chute.

A longitudinal slot 32 extends from one end to the other of table 22 of accommodate the mechanism for carrying cartons through the machine. This slot divides the main portion of the table 22 from two auxiliary table portions 22′ and 22″, the former portion supporting the carton opening mechanism and the latter portion supporting the carton closing mechanism.

Figure 4:
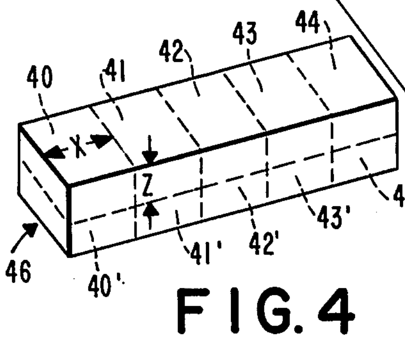
FIG. 4 is a diagrammatic perspective view of a carton of cigarettes.

The opening station 14 carried on table portion 22′ is of conventional construction and is illustrated diagrammatically as comprising a guide rail 34 and an opener plow or knife 36. The table portion 22′ is formed with a carton flap-receiving slot 38 which extends parallel to the path of travel of the carton adjacent the knife 36. As may be seen more clearly in FIG. 2, the opening 38 includes an enlarged portion 38′ which extends under the leading edge of knife 36 to accommodate the carton closure flap as it is folded downwardly during the opening operation. In operation, a carton to be opened is placed on its side at the loading station 12 with the cigarette packages lying flat on their sides in a generally horizontal position and in two stacked rows as indicated in FIGS. 3 and 4. As is conventional, each carton contains two rows of cigarette packages, with five packages 40–44 and 40′–44′ in the upper and lower rows, respectively, the packages being enclosed by a suitable carton 46. The carton in which the cigarette packages are contained is constructed with closure flaps on at least one side, which flaps may be opened to expose the ends of all of the packages within the carton. The carton is, therefore, placed in the loading station with the ends of the cigarette packages which are to receive the tax stamps or transfers being adjacent the guide rail 34 and the carton is held firmly in place by adjustment of guide rail 24. When the carton is advanced from the loading station through the opening station 14, the opener 36 engages the closure flaps on the end of the carton and separates them, folding one flap 48 upwardly and the other flap 50 downwardly to thereby expose the packages. The downwardly folded flap is guided into slot 38 which holds it in the open position while the upper flap may similarly be held in position by the opener 36, or by other convenient means known to the art.

Movement of the packages to which the transfer stamps are to be applied through the machine of the present invention is accomplished, in the preferred mode illustrated herein, by a conveyor in the form of a drive chain 52 which extends the length of the base support 22 and which is carried at one end by a drive pulley 54 and at the other end by an idler pulley 56, both suitably mounted for rotation about corresponding shafts 58 and 60 mounted to the table 22 or to other convenient frame means provided for that purpose. Although the diagrammatic illustration of FIG. 1 does not incorporate such a frame mechanism for convenience in illustrating the essential features of the present invention, it will be understood that such a frame, having suitable support legs and incorporating brackets for receiving and holding the various parts of the machine of the present invention, will normally be provided. Only in those parts of the mechanism where it is necessary to differentiate a support element from the operating mechanism is the frame illustrated diagrammatically.

The shafts 58 and 60 support the drive chain 52 with the upper run 62 thereof being located in or adjacent the longitudinal slot 32 on the support table 22. The upper run 62 moves from left to right as viewed in FIG. 1, carrying the packages the length of the machine of the present invention, while the lower run 64 is spaced below the support. Secured at spaced locations along the drive chain 52 are a plurality of spacer or drive blocks 66–77 adapted to engage the cartons which are to be carried through the machine. These blocks are secured as by fasteners 78 to the chain at equally spaced intervals to define equal segments of the chain, the fasteners being releasable to permit replacement of the blocks where desired.

As indicated in FIG. 2, the spacer blocks 66 through 77 are arranged to ride along the top surface of the table 22 as they travel along the upper run 62 of the drive chain, the blocks engaging the cartons placed in the loading station 12 and carrying them along the guide channel defined by guide rails 24 and 34 and by table 22. As illustrated in FIGS. 1 and 2, the drive blocks preferably are of different sizes so that when the cartons are engaged sequentially, each carton is at a slightly different location with respect to the equally spaced attachment points on the guide chain. These blocks are interchangeable so that the relative position of each carton, with respect to fixed, equally spaced points along the drive chain, as it moves through the machine can be preselected.

The drive chain 52 is driven through suitable gearing in an intermittent manner so that each carton in turn is advanced, and then brought to a complete stop for a period of time when it reaches the transfer station 16. When this stop occurs, the transfer mechanism is activated to place the required tax stamps or transfers on each of the packages in the opened carton by means of the transfer mechanism generally indicated at 80 in FIG. 1. To simplify the controls for the drive mechanism, the intermittent operation of the chain is arranged so that the chain moves an equal distance each time it is advanced, so that each segment of the chain stops in the same relative position with respect to the transfer station. If the drive blocks 66–77 were all the same size, each carton would stop at the same position at the transfer station; such an arrangement would be satisfactory for standard sized cigarette cartons and thus equal-sized blocks would be used in that case. Because of the unusual size of the newer style of cigarettes, it has been found necessary to stop the cartons at varying positions in the transfer station to permit transfer of the tax stamps to the smaller sized packages, and thus different sizes of blocks are provided.

The transfer applying unit 80 includes a platen 82 carried on a movable backing plate 84. The platen is of conventional construction, and preferably is of the heated type, incorporating suitable heating elements (not shown) which maintain it at a temperature suitable for transferring tax stamps or other transfers from transfer sheets 86, which also are of conventional construction and commercially available. The movable backing plate 84 is mounted on one end of a pair of shafts 88 and 90 which pass through corresponding journal blocks 92, 94 and 96, 98, respectively, and are secured at the opposite ends to a drive bar 100. The bar 100 includes a depending bracket 102 to which one end of a first lever arm 104 is pivotally connected as by a pin 106. The opposite end of arm 104 is pivotally connected to one end of a second lever arm 108 by means of a pin 110, the opposite end of arm 108 being connected by means of a pivot pin 112 to a fixed point 114 which may be a part of the machine frame. Arm 108 carries a cam follower 116 which is driven along a reciprocating path by means of a suitable cam 118. Cam 118 includes a shaped face (not shown) which drives the follower in a reciprocating path forwardly and rearwardly in the direction of arrow 120 once each revolution of the cam. This motion of the cam follower causes arm 104 to drive the bracket 100, and thus the shafts 88 and 90, in a reciprocal path whereby the platen 82 moves from a stationary position spaced from the cigarette packages which are to be stamped, toward and into contact with the packages and back to its original position once for each revolution of cam 118. The exact motion of the platen will depend upon the shape of the cam; thus the cam is shaped so that the platen is held against the cigarette packages sufficiently long to effect transfer of the tax stamps from the intervening decal sheet 86.

Cam 118 is mounted on a suitable drive means such as a rotary shaft 122 driven by an electric motor 124 through a motor output shaft 126, a drive pulley 128, a drive belt or chain 130, and a driven pulley 132. The pulley 132 is mounted on a shaft 134 which serves as the input to an electrically controlled single revolution clutch 136, shaft 134 being driven for continuous rotation by motor 124 during operation of this machine. Clutch 136 preferably is a CB Series incremental rotation control package, which is a preassembled industrial clutch-brake manufactured by Warner Electric Brake and Clutch Company of Beloit, Wisconsin. This is a solenoid-operated clutch which, when energized, releases a stop collar on the clutch to permit the input shaft 134 to engage the output shaft 122. The continuously rotating input shaft remains coupled to the output shaft for a single revolution, at which time a brake spring is activated to instantaneously stop the output shaft, if the solenoid has been deenergized. Thus, each time the clutch 136 is activated, shaft 122 rotates through a single revolution, causing cam 118 to drive the platen through a single reciprocating cycle. Although the clutch 118 is illustrated as being at right angles to the follower 116, with the face of the clutch carrying the desired contour to control the motion of the platen, it will be evident that other cam arrangements may be utilized.

The platen 82 is also movable in a lateral direction for adjustment with respect to the transfer sheet 86. This is accomplished by mounting the journal blocks 92 and 96 on a laterally extending support shaft 140 and by similarly mounting the journal blocks 94 and 98 on a laterally extending support shaft 142. Shafts 140 and 142 are secured to stationary mounting points 144–147 which again may be parts of the machine mounting frame. The journal blocks 92, 94, 96 and 98 are secured to a spacer plate 150 so that all of the blocks move together; the plate incorporates a depending bracket 152 by means of which the blocks may be moved simultaneously along their respective lateral shafts 140 and 142. This permits the location of platen 82 to be adjusted laterally with respect to transfer sheet 86, again to insure proper placement of the tax stamps or transfers on the cigarette packages.

Lateral motion of platen 82 is accomplished through bracket 152 by means of a suitable drive mechanism which may comprise a first lateral lever arm 154 pivotally connected at one end by a pin 156 to bracket 152, and at the other end pivotally connected to a second lever arm 158. Arm 158 is pivotally mounted at an intermediate point to a fixed reference 160, which may be a part of the machine frame, by means of a pin 162. The opposite end of the lever arm 158 carries a cam follower 164 which engages a shaped rotary cam 166. This cam is mounted on a shaft 168 which is driven through a reduction gear 170 by the output shaft 172 of a solenoid-operated single revolution clutch 174 of a type similar to clutch 136. The input shaft 176 to clutch 174 is continuously driven by motor 124 through shaft 126, drive pulley 178, drive chain 180, and driven pulley 182.

In the preferred embodiment of this invention, the reduction gear 170 causes the cam 166 to turn only 1/6 of a revolution each time the clutch 174 is energized, the shaped periphery of the cam serving to position the platen laterally in the desired location for each transfer operation.

Also connected to output shaft 172 is a drive pulley 184 which is connected by way of a chain or belt 186 and a driven pulley 188 to the carton-advancing conveyor 52. Pulley 188 is preferably mounted on shaft 58 to drive pulley 54 so that motion of the conveyor is synchronized with the lateral motion of the platen 82, whereby a carton is advanced into the transfer station and the platen is moved into the required position between the successive transfer operations. The single revolution clutch 174 insures that the conveyor 52 will advance a fixed distance each time the clutch is energized, thereby positioning the cartons sequentially in the transfer station. Thus, operating both the conveyor 52 and the platen 82 from output shaft 172 synchronizes the positioning of the cigarette cartons by the blocks 66–77 with the lateral shifting of the platen so that the tax stamps will be properly positioned on the cigarette packages. To maintain synchronization, the pulleys 54 and 188 may be fastened together by means of a pin 190 which may be secured to pulley 188 to extend into a selected one of apertures 192, 194 or 196 in pulley 54. By selecting the appropriate aperture, the relationship between the position of conveyor 52 and the position of platen 82 can be adjusted to insure proper alignment of the platen with the cigarette packages to be stamped.

After the tax stamps or transfers have been affixed to the cigarette packages by advancement of the platen against the transfer sheet and the packages, and the platen 82 has been withdrawn, the conveyor is activated to carry the carton of stamped packages from the transfer station to the closure station 18. The closure station includes various components for folding the flaps 48 and 50 over the end of the carton, applying adhesive and sealing the carton so that it is ready for delivery to a retailer. The closing components are mounted on table portion 22″ and may include a guide fence 200, a lower flap plow 202 for folding the bottom flap 50 upwardly, and a top plow 204 for folding the upper flap 48 downwardly. As the carton moves onto table portion 22″, the lower flap enters a longitudinal slot 206 and is guided by that slot into contact with plow 202. An aperture 208 in the table top permits the flap to be folded upwardly and over the end of the carton. As is conventional in this art an adhesive applicator may be located in the aperture 208 between guide fence 200 and plow 204 to apply a line of adhesive to the turned-up lower flap so that when the top flap is turned down by plow 204, the carton is effectively sealed. The end of plow 204 acts as a guide fence for the carton as it is carried through the closure station to the exit station 20, where the carton is removed from the stamping machine. The closure apparatus is shown diagrammatically herein, and it will be understood that any conventional closure means may be used to reclose and seal the cartons.

The transfer sheet 86, which carries the transfers, decals, or other tax stamps which are to be applied to the cigarette packages, is of a structure which is well known in the art, and such sheets are commercially available. In the preferred form used with the present invention, the sheet comprises a paper web or base having a wax coating on which the tax stamps are printed. A thermoplastic adhesive layer is provided on the outer surface of the transfers so that when heat is applied to the back of the sheet as the transfer is pressed against a cigarette package, the wax will melt to release the transfer from the backing sheet and the adhesive will be activated to secure it to the package. The transfer sheet is furnished in a large roll 210 which may be mounted on a support shaft 212, the sheet being fed around a series of guide rolls 214, 216 and 218 to take-up reel 220. The arrangement of the guide rolls is such that a vertical run 222 is provided at the transfer station perpendicular to the support table 22 and thus generally parallel to the ends of the cigarette packages to which the stamps are to be applied. The take-up reel 220 is mounted on a shaft 224 which carries a ratchet 226 that may be activated to rotate the reel and thereby advance the sheet 86. A pawl 228 is connected to the reciprocating arm 108 by means of pin 110 for actuation by the drive mechanism which reciprocates the platen. Suitable clutch means 229 may be provided in conjunction with the pawl and ratchet arrangement to advance sheet 86 periodically; in the preferred embodiment, the sheet will be advanced for every third activation of the platen since it requires three operations of the platen to transfer all of the tax stamps in each row of stamps on the decal sheet. The clutch 229 may be a mechanical device that operates reel 220 every third operation of pawl 228, or may be solenoid-operated device that is activated by cam 166 for example.

As illustrated in FIGS. 1 and 4, the tax stamps or transfers, indicated at 230 on sheet 86 are secured to the backing sheet in rows of 15 extending across the width of the sheet, the distance between centers of adjacent stamps in the commercial form of the sheets being about ¾ of an inch, and adjacent rows also being spaced by about ¾ of an inch. As previously indicated, this spacing of the tax stamps or transfers has in the past presented no particular problem, since cigarette packages tended to be of a standard size and this spacing of stamps was designed to accommodate that size. As illustrated, in the drawings, the platen 82 is actually formed of a series of ten platen elements 232 and 232′ formed in two rows of five each, respectively, the elements being spaced about 2 ¼ inches center to center transversely across the platen in each row, with adjacent rows being vertically spaced by about ¾ of an inch. This spacing of the platen elements generally corresponds to the spacing of the cigarette packages in a conventional carton, so that operation of the platen against the transfer sheet serves to properly transfer a set of ten transfers from two rows onto the corresponding packages. The spacing of the platen elements insures that from the two rows aligned in the transfer station only every third tax stamp 230 and 230′ in the rows (i.e., one set) will be transferred in a given operation of the platen, and three successive operations of the platen are required to remove all three sets of stamps from the two rows. Thus, three forward movements of the platen provide stamps for three cartons of cigarettes; thereafter, the sheet 86 is advanced to position two more rows of stamps in the transfer station for placement on three successive cartons, and so on.

The advent of cigarette packages and cartons having smaller dimensions than the previously standard dimensions created a serious problem with prior transfer operations, since the spacing of the transfer stamps no longer corresponded to the package and carton sizes; as a result it became necessary to apply the transfer stamps to these new size packages manually. The machine of the present invention, however, obviates the need for manual application of the transfer stamps, permitting application of the stamps from a pair of rows sequentially to three cartons of cigarettes in the manner illustrated in FIGS. 6–11.

Figure 6:
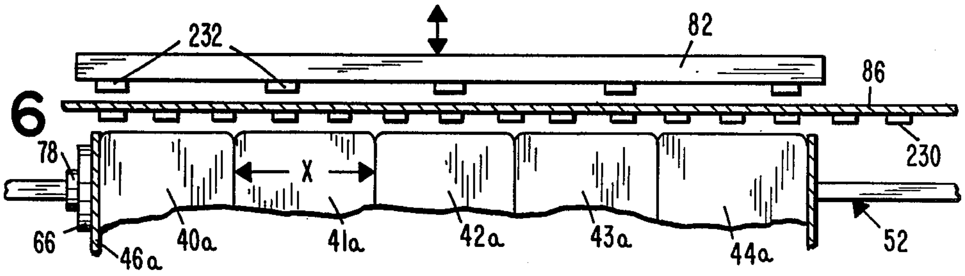
FIG. 6–11 are diagrammatic illustrations of the sequence of steps followed in the cyclical operation of the machine of FIG. 1.

FIG. 6 illustrated as first step "A" of the cycle operation of the present invention, wherein a first carton of cigarettes 46*a* is carried into the transfer station and the conveyor 52 is stopped to position fastener 78 and its attached drive block 66 at a predetermined location with respect to station 16. The platen 82 is similarly positioned at its first predetermined location, corresponding with the location of the carton 4*a*, which is determined by the size of block 66, so that the platen elements 232 are aligned with the first, fourth, seventh, tenth, and thirteenth transfers on row 230 of sheet 86. Similarly, the elements 232' will be aligned with corresponding stamps in row 230'. Although the spacing of the platen elements and the tax stamps was designed for standard-sized packages, it will be seen that by careful location of the carton 46*a*, each of the platen elements 232 will be aligned with one of the cigarette packages 40*a*–44*a* so that reciprocating motion of the platen toward and away from the packages will press the corresponding set of transfers against each of the packages, thereby transferring a single stamp to each cigarette package. Upon completion of the transfer, the platen 82 is withdrawn, returning to its initial position and completing step A of the operation.

Figure 7:
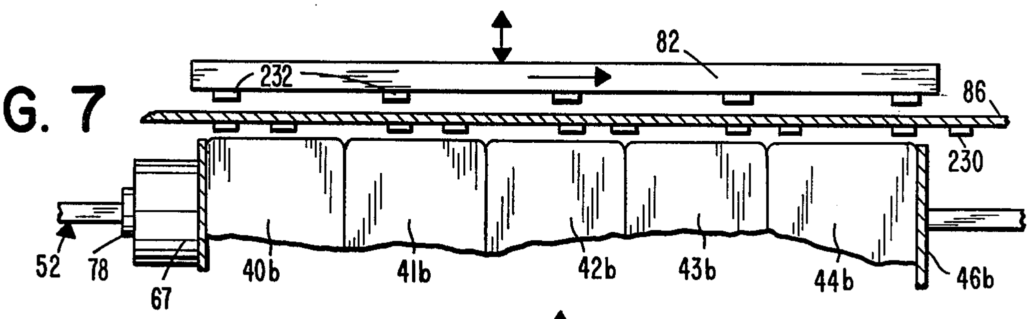

The conveyor 52 is activated to advance a fixed distance, carrying carton 46*a* out of the transfer station to the closing station, and at the same time moving a second carton 40*b*, illustrated in FIG. 7, into the transfer station to initiate step B of the operation. Carton 40*b* is carried by drive block 67 wich is of a larger size than block 66 and which therefore carries carton 40*b* to a different relative location which is shifted to the right, as viewed in the figure of the position assumed by carton 46*a*. It will be seen that the fastener 78 for block 67 assumes the same position as the fastener for the previous conveyor segment since the chain advances a fixed and constant distance for each stamping operation, but the block 67 is selected to position carton 46*b* so that its packages 40*b*–44*b* and 40*b'*–44*b'* will be aligned with the second, fifth, eighth, eleventh and fourteenth transfers on the two rows of sheet 86, which comprise the second set. At the same time, platen 82 is shifted to the right so that its elements 232 and 232' will be aligned with the second set of transfers 230 and 230' and upon reciprocation of the platen these stamps will be transferred to their corresponding packages.

Figure 8:
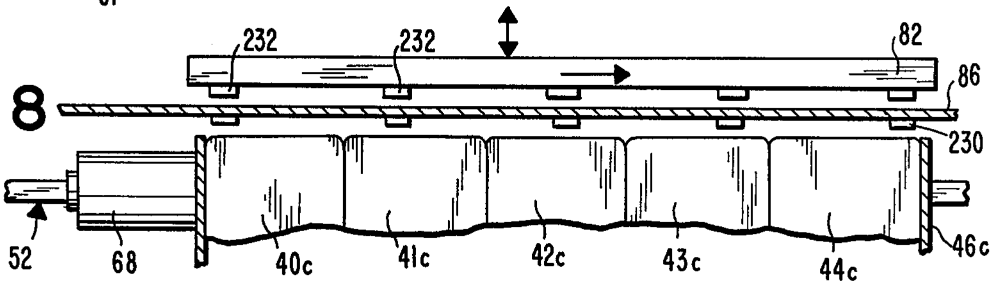

Upon withdrawal of platen 82 at the completion of step "B", conveyor 52 advances a third carton 46*c* into the transfer station for step "C", and this carton is aligned by its drive block 68 with the remaining set of stamps on sheet 86. At the same time, platen 82 is shifted to the right a corresponding amount, so that the last remaining stamps in the two rows are transferred to packages 40*c*–44*c* and 40*c'*–44*c'*. Again, the conveyor 52 and fastener 78 are halted at the predetermined position, with the size of drive block 68 being selected to properly locate carton 46*c*, as illustrated in FIG. 8.

If desired, after transferring the third set of stamps to complete step "C", the platen may be shifted laterally to the left, back to the initial position illustrated in FIG. 6 for a repetition of the above-described steps A–C, and thus these steps may be referred to as a first cycle of operation of the machine, However, it has been found that a savings in time and motion can be obtained by maintaining the platen in its third position and reversing the prior three steps for the next three cartons in what may be termed a second, or reverse, cycle of operation, comprising steps D, E and F.

Figure 9:
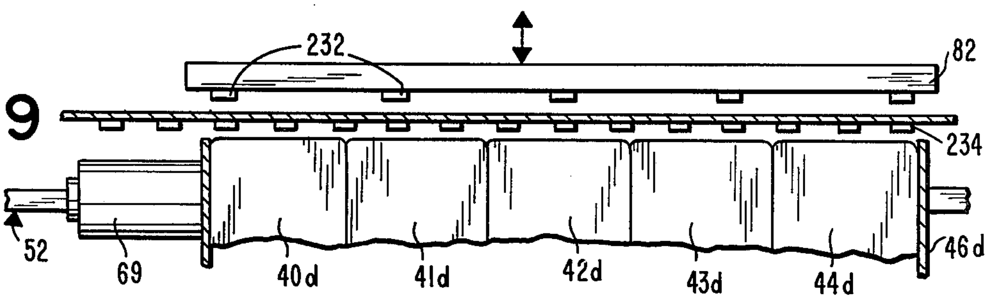

As illustrated in FIG. 9, therefore, upon completion of the stamping of carton 46*c*, the next carton in the sequence, 46*d*, is moved into position by conveyor 52, with the pusher block 69 positioning the carton at the third location for the start of step "D". Since the previously three steps have depleted all of the transfer stamps on rows 230 and 230', the sheet 86 is at this time advanced by the pawl and ratchet arrangement 226, 228 to draw the next two rows of transfer stamps 234 and 234' into the transfer station for application to the packages by platen elements 232 and 232'. The platen is not shifted laterally for this step, but after advancement of the transfer sheet and positioning of the carton 46*d*, is reciprocated to transfer the third, sixth, ninth, twelth, and fifteenth stamps (i.e., the third set) from rows 234 and 234' to packages 40*d*–44*d* and 40*d'*–44*d'* in carton 46*d*. Carton 46*d* is located at the same position with respect to the transfer station as was carton 46*a*, and accordingly block 69 is the same size as block 68.

Figure 10:
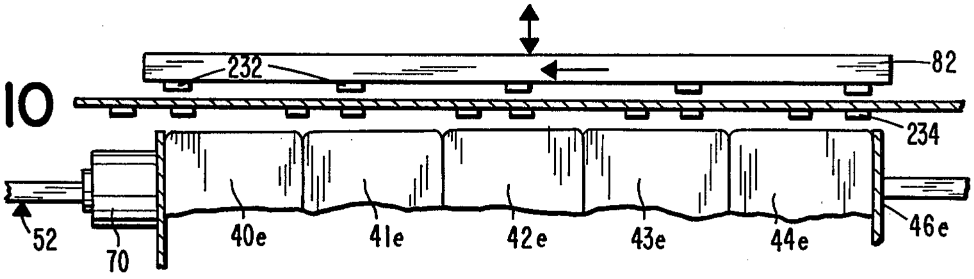
Figure 11:
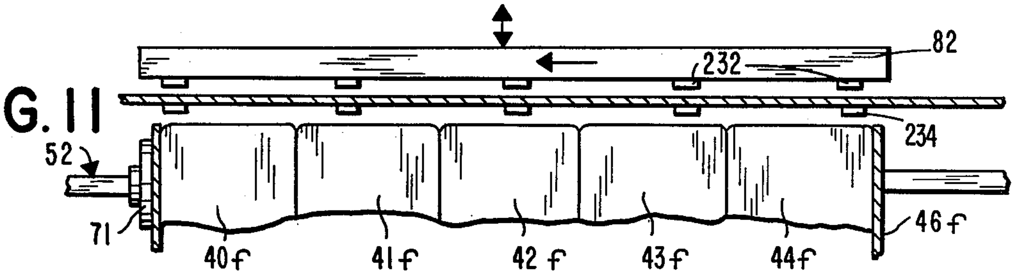

As illustrated in FIG. 10, the next carton in the sequence, 46*e*, is then positioned by conveyor 52 and block 70 for step "E", the block 70 being the same size as block 67 to position carton 46*e* at the same relative place as carton 46*b* in the second location at the transfer station. Also, platen 82 is shifted to the left so that its elements are aligned with packages 40*e*–44*e* and the corresponding stamps are transferred. Finally, in the last step "F" illustrated in FIG. 11, carton 46*f* is drawn into the transfer station and is positioned by drive block 71 in the first, or "A" location, platen 82 is shifted to the left, returning to its initial position, and is aligned with packages 40*f*–44*f* and 40*f'*–44*f'* to transfer the last remaining stamps in rows 234 and 234' on the corresponding packages to complete the return cycle. The operation illustrated in FIGS. 6–11 is thereafter repeated. Thus, it may be seen that by careful location of each of the cartons, and by corresponding shifts in the position of the platen, while holding the transfer sheet in a fixed location, the stamps or transfers can be placed on the small cigarette packages even though the width of the packages, indicated by the distance $x$ in FIG. 6, is less than what has previously been useable in automatic stamping machines.

As has been indicated, the cam 166 (FIG. 1) is so shaped as to periodically shift the platen 82 to the locations illustrated in FIGS. 6–11. The cam is divided into size segments, as illustrated in FIG. 12, so that a single rotation of the cam moves the platen through the complete cycles described above. Thus, a first segment of the cam, indicated at *a*, positions the platen for carton 46*a*, second segment *b* positions it for carton *b* and so on, the platen returning to its original position for carton *f* and remaining in that position for the next in sequence. A single rotation of the cam thereby produces a forward and a reverse, a return, cycle of the platen, these cycles placing transfers on six cartons from two pairs of twos of transfers.

It will be noted that in the illustrated embodiment of the invention, the conveyor 52 carries two sets of blocks, blocks 66–71 positioning cartons for steps A–F in sequence, and blocks 72–77 providing a second identical sequence of steps A–F. However, it will be apparent that this arrangement will depend upon the length of the conveyor required to carry the cartons through the various stations of the stamping machine and the length of conveyor segments required for proper spacing of the cartons.

The sequential operation of the machine of the present invention preferably is under the control of a plurality of microswitches located to sense the presence or absence of a carton in the loading station and in the transfer station, and to activate one or the other of the solenoid clutches 136 and 174. A simplified schematic diagram of the control circuit is illustrated in FIG. 13 wherein the motor 124 is shown connected across power supply lines 236 and 238, through a master on-off switch 240. In order to provide maximum speed of response, the motor 124 is continuously energized so that input shafts 134 and 176 are continuously rotating. Operation of the conveyor, and thus advancement of cigarette cartons, is controlled by a microswitch 242 located at the loading station 12 and responsive to the placement of a carton in the guide chute on the table 22. Switch 242 is thus controlled by the presence of a carton available to be advanced by the conveyor chain 52 and closure of this switch activates the solenoid clutch 174. As previously indicated, this results in a single rotation of output shaft 172 to advance the conveyor one position and to rotate cam 166 one position. Similarly, a microswitch 244 is located at the transfer station to control solenoid clutch 136. When a carton is available to be stamped at this station, switch 244 closes to activate solenoid 136, producing a single rotation of shaft 122 and a single reciprocal motion of the platen 82. A second microswitch 246 may be connected in series with an interlock switch 244 responsive to the motion of the platen to prevent operation of solenoid 136 when the platen 82 is out of its rest position. This keeps the solenoid from being continuously energized and insures that only a single stamp will be placed on each package.

As previously indicated, the pawl and ratchet 226, 228 preferably are constructed to advance the sheet roller 220 only on every third operation of the platen 82. If desired, this may be accomplished by means of a solenoid type clutch 229 connected in the shaft 224 to permit operation of the roller only when its corresponding switch 250 is closed. Switch 250 may be a counter operated by the motion of lever arm 108, for example, or by the cam 118, thereby regulating the advancement of the transfer.

Because the proper operation of the present system depends upon the proper alignment of each carton of packages with the transfers located on the decal sheet 86, it is apparent that some means must be provided to synchronize the conveyor 52 with the transfer sheet 86, particularly at start up of the machine, or when there is a changeover from one size cigarette package to another size. This synchronization is provided by means of a synchronizing switch 252 which may be manually operated to activate relay 174 to advance the conveyor to a predetermined location. A microswitch 254 may be provided in series with switch 252 to open the circuit to solenoid 174 when the chain drive has reached the desired position. The microswitch 254 may, for example, be responsive to the cam 166 so that energization of solenoid 174 by switch 252 will cause the chain to advance until pusher block 66, or its corresponding block 72, reaches the loading station 12 in preparation for the start of a sequence. Switch 254 would then open, and the system would operate in the normal manner.

When the end of a run of cartons is reached, and transfers have been placed on the last packages of that run, occasionally it will occur that not all of the transfers on a particular row at the transfer station will have been applied. Since these transfers are paid for in advance, it is desirable to incorporate some means for advancing the conveyor 52 a preselected number of steps so that the next carton placed in the loading station will be positioned in the transfer station in the proper position to receive the remaining stamps. Thus, for example, if the last carton in a series appeared in position A and was stamped, positions B and C being empty but advanced so that carton A is closed and shifted out of the machine, it would be desirable to have the next carton inserted into the machine, be moved to position B for stamping purposes without in the meantime advancing either the platen or the transfer sheet. This may be accomplished by providing a counter in conjunction with switch 254 so that upon depression of switch 252 the conveyor will be advanced a predetermined number of steps to present pusher block 67 or its equivalent block 73 at the loading station. This would result in the next carton placed in in the machine being advanced to the transfer station to position B. When this carton reaches the transfer station, the microswitch 244 will activate solenoid 136 to activate the platen in the manner illustrated in FIG. 7, and the machine thereafter operates in the normal manner. Various other control functions may be provided as desired, such as for example, the manually operated switches 256 and 258, the former being provided to allow manual operation of solenoid clutch 136 and the latter preventing operation of the transfer sheet advance mechanism. These and additional control functions are within the skill of the art, and need not be further defined herein.

Although the transfer mechanism generally indicated at 80 in FIG. 1 is the preferred mode for the present invention, it will be understood that various other arrangements may be utilized to transfer tax stamps or other indicia to the packages carried along the guide table 22. Thus, for example, it may be desirable to utilize in place of the transfer sheet 86 an ink transfer sheet 260 on which the ink is placed in a complex and sophisticated pattern which would be reproduced on the cigarette packages when transferred by the platen indicated in FIG. 14 at 82'. The complex ink pattern would be designed to minimize the danger of counterfeiting, and would produce a unique and identifiable pattern on the cigarette package. The ink preferably would be of a thermoplastic type transferable from sheet 260 onto the cigarette packages by the heated platen elements, as is the case with the transfers 230. As a still further alternative, the platen elements may be provided with a relief pattern such as that indicated on elements 262, which pattern may be a complex and arbitrary design, or may be in the form of letters, which will transfer the ink on sheet 260 in a corresponding pattern. This provides an even more complex printed pattern on the packages, making counterfeiting even more difficult.

Thus, there has been described a machine for affixing tax stamps in the form of transfers, ink patterns or the like onto packages such as cigarette packages contained in a carton, which packages are spaced in a non-standard manner, the machine permitting use of standardized transfer sheets and printing platens. The machine has been shown in diagrammatic form to illustrate the principles of operation contemplated, and it will be evident to those of skill in the art that numerous variations and modifications can be made in carrying out the principles so described. However, it is to be understood that such variations are included within the true spirit and scope of the invention as it is defined in the following claims.

What is claimed is:

1. A method for applying transfers to a plurality of packages, comprising:
   - advancing a first plurality of packages into a transfer station having a movable platen, means for supporting the packages, and a transfer sheet carrying rows and columns of tranfers, said transfer sheet being interposed between said platen and said packages with at least one row of transfers aligned with said packages;
   - positioning said first packages at a first position in said transfer station with each of said first packages aligned with a corresponding one of a first set of transfers in said at least one row of transfers;
   - aligning said platen with said first set of transfers;
   - moving said platen into engagement with said first set of transfers and said first packages to place one transfer from said first set on each of said first packages;
   - withdrawing said platen after completion of said transfer;
   - removing said first packages from said transfer station and advancing a second plurality of packages into said transfer station;
   - positioning said second packages at a second position in said transfer station with each of said second packages aligned with a corresponding one of a second set of transfers in said at least one row of transfers;
   - shifting said platen laterally to align it with said second set of transfers, said transfer sheet remaining stationary;
   - moving said platen into engagement with said second set of transfers and said second packages to place one transfer from said second set on each of said second packages; and
   - withdrawing said platen after completion of said transfer.

2. The method of claim 1, further including repetitively advancing packages into said transfer station, aligning the packages with corresponding sets of transfers on said transfer sheet, shifting said platen into alignment with the corresponding sets of transfers, moving said platen to place the transfers on the corresponding packages, and withdrawing said platen until all sets of transfers on said at least one row have been applied to corresponding packages, thereby completing a cycle of operation, and thereafter advancing said transfer sheet to align at least one new row of transfers with packages in said transfer station.

3. The method of claim 2, wherein said platen is shifted laterally in a first direction in a first cycle of operation and wherein, after advancing said sheet, said platen is shifted laterally in the opposite direction during a second cycle of operation to apply all of the sets of transfers in said at least one new row of transfers to corresponding packages, said platen being returned to its first position at the end of said second cycle.

4. The method of claim 1, wherein the step of positioning packages at corresponding positions comprises,
   - advancing said packages by a segmented conveyor, each segment being defined by drive blocks which engage said packages, said blocks being secured at equally spaced locations along the conveyor;
   - periodically driving said conveyor a fixed distance to advance one segment, each segment in turn being aligned with the same predetermined position in said transfer station; and
   - selecting the size of each said drive block to shift the location of the packages relative to said predetermined position, whereby the packages driven by each block will be properly located in said transfer station.

5. The method of claim 1, further including:
   - removing said second packages from said transfer station and advancing a third plurality of packages into said transfer station;
   - positioning said third packages at a third position in said transfer station with each of said third packages aligned with a corresponding one of a third set of transfers in said at least one row of transfers;
   - shifting said platen laterally to align it with said third set of transfers, said transfer sheet remaining stationary;
   - moving said platen into engagement with said said third set of transfers and said third packages to place one transfer from said third set on each of said third packages;
   - withdrawing said platen after completion of said transfer; and
   - advancing said transfer sheet.

6. In a method of applying tax stamps to cigarette packages of non-standard dimensions which are packaged in cartons, said tax stamps being mounted on conventional transfer sheets in rows and columns which are, spaced for application to packages of standard dimensions, loading cartons of cigarette packages to be stamped for advancement by a conveyor, advancing each carton in turn through an opening station, a transfer station and a closing station, stopping each opened carton in said transfer station, and applying tax stamps to each package in said carton, the improvement comprising: ;p1 positioning a first carton at a first location in said transfer station with each package in said carton disposed on its side and the ends of each of said packages aligned with a corresponding one of a first set of tax stamps on said sheet;
   - aligning a platen with said first set of tax stamps;
   - reciprocating said platen to drive said set of tax stamps against the ends of corresponding packages to transfer said stamps from said sheet to said packages;
   - advancing said first carton out of said transfer station and advancing a second carton into said transfer station;
   - positioning said second carton at a second location in said transfer station with each package in said second carton aligned with a corresponding one of a second set of tax stamps on said sheet, said sheet remaining stationary;
   - shifting said platen laterally into alignment with said second set of tax stamps; and
   - reciprocating said platen to drive said second set of tax stamps against corresponding packages to transfer said stamps from said sheet to said packages.

7. The method of claim 6, wherein the steps of positioning cartons at said first and second locations include:

advancing said cartons sequentially by a segmented conveyor, each segment being defined by a drive block which engages a carton, said blocks being secured at equally spaced locations along said conveyor;

periodically advancing said conveyor a fixed distance to advance one segment and to drive a corresponding carton into said transfer station, each segment in turn being thereby advanced into alignment with a predetermined fixed position in said transfer station; and selecting the size of each drive block to locate its corresponding driven carton at either said first location or said second location.

8. The method of claim 7, further including repetitively advancing said conveyor to advance cartons to said first and second locations, shifting said platen, and reciprocating said platen to apply tax stamps to packages in said cartons.

9. The method of claim 8, further including periodically advancing said transfer sheet to advance new sets of tax stamps into said transfer station.

10. The method of applying transfers to a plurality of sets of packages, comprising:

periodically and sequentially advancing sets of packages laterally past a transfer sheet, said sheet being laterally stationary and carrying sets of transfers arranged in rows and columns;

halting each said set of packages at a selected one of a plurality of locations with respect to said transfer sheet, each set of packages being halted at a location that is aligned with a corresponding different set of transfers;

shifting a movable platen laterally with respect to said transfer sheet for alignment with the set of packages and corresponding transfers at the selected location; and reciprocating said platen to carry said set of transfers into engagement with said corresponding set of packages.

11. The method of claim 9, further including advancing a plurality of sets of packages past said transfer sheet, halting each of said sets at a different one of said plurality of locations, shifting said movable platen into alignment with the selected location, and reciprocating said platen, whereby all the sets of transfers in a first row of transfers are applied to corresponding sets of packages, and thereafter advancing said transfer sheet longitudinally.

12. The method of claim 10, wherein the step of advancing sets of packages comprises engaging each set of packages by a drive block, each drive block being secured at equally spaced locations along a conveyor to define a segmented conveyor and periodically driving said conveyor a fixed distance with respect to said transfer sheet, and wherein the step of halting said sets of packages includes stopping said conveyor after it has traveled said fixed distance.

13. The method of claim 12, further including:

selecting the size of each said drive block to shift the locations of said sets of packages with respect to said segments, whereby each set of packages is aligned with a corresponding set of transfers upon halting said conveyor.

* * * * *